C. ANDREASON.
VEHICLE FRAME SUSPENSION.
APPLICATION FILED NOV. 29, 1920.
1,393,599. Patented Oct. 11, 1921.
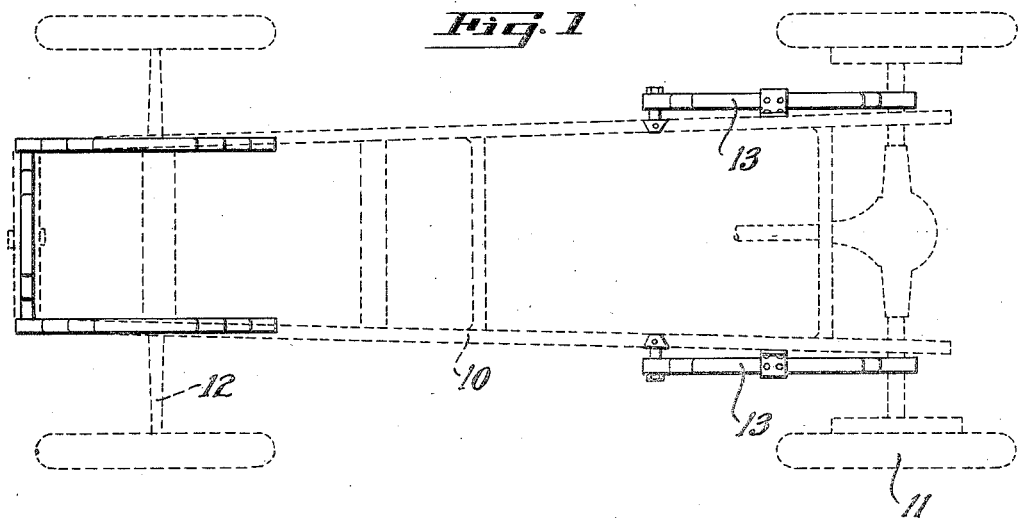
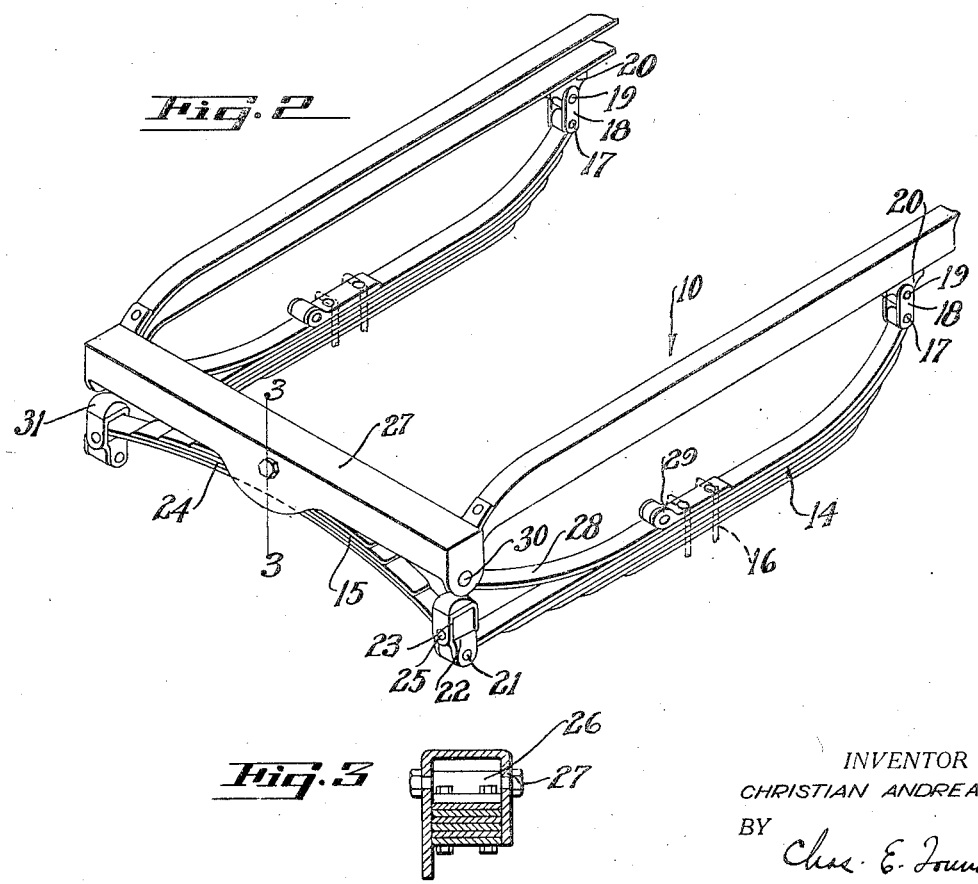
INVENTOR
CHRISTIAN ANDREASON.
BY Chas. E. Townsend
ATTORNEY

UNITED STATES PATENT OFFICE.

CHRISTIAN ANDREASON, OF SACRAMENTO, CALIFORNIA, ASSIGNOR OF FIFTY PER CENT. TO LOUIS A. MORRISON, OF MARYSVILLE, CALIFORNIA.

VEHICLE-FRAME SUSPENSION.

1,393,599.   Specification of Letters Patent.   Patented Oct. 11, 1921.

Application filed November 29, 1920. Serial No. 426,905.

*To all whom it may concern:*

Be it known that I, CHRISTIAN ANDREASON, a citizen of the United States, residing at Sacramento, in the county of Sacramento and State of California, have invented new and useful Improvements in Vehicle-Frame Suspensions, of which the following is a specification.

This invention relates to vehicle construction, and particularly pertains to a frame suspension therefor.

It is the principal object of the present invention to provide a frame suspension for vehicles, which will afford a three point mounting for the frame upon the vehicle running gear, and will at the same time act to prevent distortion of the frame, and to eliminate undue strain which might be imparted to the vehicle body.

The present invention contemplates the use of a pair of spring members secured to the rear vehicle frame and connected with the rear axle, the forward end of said frame being supported by a pair of semi-elliptical springs, secured by shackles to the vehicle at their rear ends, and provided with a centrally pivoted cross spring connecting their front ends and supporting the frame.

The invention is illustrated by way of example in the accompanying drawing, in which:

Figure 1 is a view in plan showing the vehicle frame suspension, and indicating the frame and running gear by dotted lines.

Fig. 2 is an enlarged view in perspective, showing the forward frame suspension means with which the present invention is particularly concerned.

Fig. 3 is a view in vertical section through the cross spring pivot, as seen on the line 3—3 of Fig. 2.

Referring more particularly to the drawing, 10 indicates a vehicle frame mounted upon a rear axle 11 and front axle 12. As shown in Fig. 1, the rear axle is connected with the frame by springs 13. These springs may be of any preferred form. The forward end of the frame is carried upon side springs 14 and a cross spring 15, with which the present invention is particularly concerned. The side springs are semi-elliptical and are suitably secured to the axle 12 by spring clips 16. The long leaf of these springs is formed with an eye at each end, the rear eye receiving a spring pin 17 for carrying shackle plates. These plates are secured by a pin 19 to a bracket 20 on a frame. The forward eye receives a pin 21, carrying a shackle member 22. These shackle members have lower yokes between which the upper leaf of spring 14 may extend their portions 23 above and at right angles thereto for receiving the eyes of the lower leaf of a cross spring 24. Shackle pins 25 hold these members to the springs.

The cross spring 15 is preferably semi-elliptical, and is provided with a central pivot bearing 26, through which a spring bolt 27 extends. The bearing 25 is disposed on the uppermost one of the leaves of spring 15, and is seated between flanges of a cross frame channel. Due to this arrangement a spring 15 may swing vertically around the pivot bolt 27 and at the same time may flex as desired.

In order to maintain the vehicle frame in a horizontal line position, and to act to hold the front axle in its properly alined position, an alining leaf 28 is provided each of the side springs. This leaf is pivotally secured above the long leaf of the side springs by means of a plate 29, secured in position by the shackle bolts and in a manner to permit the leaf 28 to swing vertically. The forward ends of the leaves 28 are secured by pins 30 to the ends of the cross frame member 27.

In the event that excessive movement of the vehicle springs takes place, or that the cross spring is greatly flexed bumper members are provided. These consist of resilient blocks mounted directly upon the upper flat faces of the shackles 22. It will be evident, therefore, that excessive movement of the springs in relation to the main frame will cause the frame to strike these blocks and rebound.

In operation of this invention, vehicle frame and running gear are equipped with suitable rear springs disposed at opposite sides of the vehicle, and with the springs 14 and 15 at the front of the vehicle. Transverse irregularities in the roadway will be absorbed by the flexure of the springs 14 and 15, and by the additional rocking movement of the spring 15. It will be evident that due to the shackle connection between the main frame and the rear of the springs 14, that unless other means are provided, excessive strain will be imparted upon the cross spring 15 and also the structure will unreliably hold the front axle in its proper position. For this reason the members 28 are used. They will act as flexible radius rods when the side springs flex and will also prevent objectionably longitudinal movement of the side springs. Resiliency of these members will act against rearward and upward movement of the front axle, and will tend to immediately restore the axle to its alined position relative to the vehicle frame.

It will thus be seen that the frame suspension here disclosed will afford a three point spring mount for a vehicle frame, at the same time insuring that all the parts may freely move and may resiliently act to hold the frame in its horizontally alined position, and the axles in their proper transversely alined positions.

While I have shown the preferred form of my invention, as now known to me, it will be understood that various changes in the combination, construction, and arrangement of parts might be made by those skilled in the art, without departing from the spirit of the invention as claimed.

Having thus described my invention, what I claim and desire to secure by Letters Patent is:

1. A vehicle frame suspension, comprising a pair of spring members for supporting a vehicle frame upon the rear vehicle axle, a pair of spring members secured by their rear ends to the vehicle frame and near the front thereof, and a cross spring centrally pivoted to the vehicle frame and pivotally connected to the forward ends of the front springs.

2. A vehicle frame suspension, comprising a pair of spring members for supporting a vehicle frame upon the rear vehicle axle, a pair of spring members secured by their rear ends to the vehicle frame and near the front thereof, and a cross spring centrally pivoted to the vehicle frame and pivotally connected to the forward ends of the front springs, and resilient means for holding the front side springs in alinement.

3. A vehicle frame suspension comprising parallel rear springs supporting a vehicle frame upon a rear axle, parallel front springs, shackles connecting the rear ends of said front springs to the side rails of the vehicle frame, said springs being secured to a front axle at points midway their length, a cross spring centrally pivoted to the vehicle frame, at a point along the longitudinal center thereof, shackle members pivotally connecting the forward ends of the front springs with the cross spring and alining leaves secured to the front side springs at their one ends and pivotally secured to the forward corners of the vehicle frame at their other ends.

4. A spring structure for vehicles comprising parallel springs, shackles at one end thereof for connecting them with a vehicle frame. A cross spring disposed at the forward end of the springs, shackle members pivotally securing said cross spring to said forward ends and alining leaves secured on top of each of the side springs and extending forwardly thereabove to be pivotally secured to a vehicle frame, and means for centrally pivoting a cross spring to a vehicle frame.

CHRISTIAN ANDREASON.